(12) United States Patent     (10) Patent No.:   US 12,594,681 B2

Itou                  (45) Date of Patent:       Apr. 7, 2026

(54) EXTERNAL ROBOT STAND AND EXTERNAL ROBOT SYSTEM

(71) Applicant: FANUC CORPORATION, Yamanashi (JP)

(72) Inventor: Masanori Itou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 369 days.

(21) Appl. No.: 18/011,308

(22) PCT Filed: Jun. 30, 2021

(86) PCT No.: PCT/JP2021/024680

§ 371 (c)(1),
(2) Date: Dec. 19, 2022

(87) PCT Pub. No.: WO2022/004766

PCT Pub. Date: Jan. 6, 2022

(65) Prior Publication Data

US 2024/0149474 A1     May 9, 2024

(30) Foreign Application Priority Data

Jul. 3, 2020    (JP) ................................ 2020-115690

(51) Int. Cl.
    B25J 19/00        (2006.01)
    B23Q 7/04        (2006.01)

(52) U.S. Cl.
    CPC ................ B25J 19/00 (2013.01); B23Q 7/04 (2013.01)

(58) Field of Classification Search
None
See application file for complete search history.

(56) References Cited

U.S. PATENT DOCUMENTS 4,736,998 A * 4/1988 Wilson ................... A47B 85/00
                               297/140
5,428,279 A * 6/1995 Sugimoto ................ B25J 19/06
                               318/563

(Continued)

FOREIGN PATENT DOCUMENTS

CN      106112680 A     11/2016
CN      107263200 A     10/2017

(Continued)

OTHER PUBLICATIONS

Chinese Office Action dated Apr. 9, 2025, for Chinese Patent Application No. 202180045727.X.

*Primary Examiner* — Khoi H Tran
*Assistant Examiner* — Dairon Estevez
(74) *Attorney, Agent, or Firm* — KARCESKI IP LAW, PLLC

(57) ABSTRACT

An external robot stand that is installed outside a machine tool includes a fixed unit fixed to the machine tool in a positioned state and a movable unit attached to the fixed unit in a detachable manner. The fixed unit is provided with a robot installation surface on which a robot that performs work with respect to the machine tool can be installed. An operating range of the robot is arranged to extend across both of the fixed unit and the movable unit. The fixed unit and the movable unit are respectively provided with safety fences that surround an outer side of the operating range of the robot together with the machine tool in a state in which the movable unit is attached to the fixed unit.

9 Claims, 8 Drawing Sheets

(56)     References Cited

U.S. PATENT DOCUMENTS

| | | | |
|---|---|---|---|
| 11,123,870 B2 * | 9/2021 | Gilchrist | ................ B25J 9/1666 |
| 2016/0325400 A1 | 11/2016 | Murakami et al. | |
| 2018/0290290 A1 * | 10/2018 | Uchiyama | ................ B25J 5/007 |
| 2019/0262957 A1 * | 8/2019 | Sugiura | .................... B23Q 7/046 |
| 2019/0351554 A1 * | 11/2019 | Onose | ..................... B25J 19/06 |
| 2021/0046599 A1 * | 2/2021 | Morimura | .......... B23Q 17/2442 |
| 2023/0311347 A1 * | 10/2023 | Demmeler | .............. B25J 19/06 |
| | | | 219/136 |
| 2024/0009856 A1 * | 1/2024 | Brand | .................... B25J 11/005 |

FOREIGN PATENT DOCUMENTS

| | | | |
|---|---|---|---|
| JP | H11123690 A | | 5/1999 |
| JP | 2001205541 A | | 7/2001 |
| JP | 3155226 U | | 11/2009 |
| JP | 2011224742 A | | 11/2011 |
| JP | 2014010791 A | | 1/2014 |
| JP | 2014058028 A | * | 4/2014 |
| JP | 2018020427 A | | 2/2018 |
| JP | 2019025555 A | * | 2/2019 |
| JP | 2019150894 A | | 9/2019 |
| JP | 2020006443 A | | 1/2020 |
| WO | 9852724 A1 | | 11/1998 |
| WO | 2016151836 A1 | | 9/2016 |

* cited by examiner

300 —→ CONTROL DEVICE

3 —→ MOVABLE UNIT

RETREAT

110

ACCESS

1

ROBOT — 200

2

MACHINE TOOL

FIXED UNIT

EXTERNAL ROBOT STAND AND EXTERNAL ROBOT SYSTEM

CROSS-REFERENCE TO RELATED APPLICATION(S)

This is a National Stage Entry into the United States Patent and Trademark Office from International Patent Application No. PCT/JP2021/024680, filed on Jun. 30, 2021, which claims priority to Japanese Patent Application No. JP 2020-115690, filed on Jul. 3, 2020, the entire contents of both of which are incorporated herein by reference.

FIELD OF THE INVENTION

The present disclosure relates to an external robot stand and an external robot system.

BACKGROUND OF THE INVENTION

In the prior art, there is a known stocker that is fixed to an outer surface of a machine tool in a positioned state, that has a robot mounted therein, and that is provided with a safety fence covering an outer side of an operating range of the robot (for example, see Japanese Unexamined Patent Application, Publication No. 2019-150894).

In the stocker of Japanese Unexamined Patent Application, Publication No. 2019-150894, the robot is mounted on a pedestal that can be moved with respect to the machine tool, and a machined/unmachined workpiece handled by the robot and a tool and a jig for replacement, etc. are stored in an upper space of the pedestal. The robot mounted on the pedestal moves the workpiece or the like between a space inside the machine tool and a space inside the stocker, the spaces being connected to each other via a door of the machine tool.

Three side surfaces of the stocker, except a side surface opposed to the machine tool when the stocker is attached to the machine tool, are surrounded by the safety fence. Thus, after the stocker is fixed to the machine tool, it is difficult to access the inside of the stocker and the machine tool from the outside, thus making it necessary to remove the whole stocker from the machine tool at the time of maintenance. Japanese Unexamined Patent Application, Publication No. 2019-150894 discloses an attaching portion and an attached portion that are used to attach the stocker to the machine tool in a detachable manner and in a positioned state.

SUMMARY OF THE INVENTION

One aspect of the present disclosure is directed to an external robot stand that is installed outside a machine tool, the external robot stand comprising a fixed unit fixed to the machine tool in a positioned state and a movable unit attached to the fixed unit in a detachable manner, wherein the fixed unit is provided with a robot installation surface on which a robot that performs work with respect to the machine tool can be installed; wherein an operating range of the robot is arranged to extend across both the fixed unit and the movable unit; and wherein the fixed unit and the movable unit are respectively provided with safety fences that surround an outer side of the operating range of the robot together with the machine tool in a state in which the movable unit is attached to the fixed unit.

BRIEF DESCRIPTION OF THE DRAWINGS

FIG. 4 is a plan view schematically showing a state in which the movable unit is separated and retracted from the fixed unit, in the external robot system shown in FIG. 3.

DESCRIPTION OF EMBODIMENT(S) OF THE INVENTION

An external robot stand 1 and an external robot system 100 according to one embodiment of the present disclosure will be described below with reference to the drawings.

Figure 1:
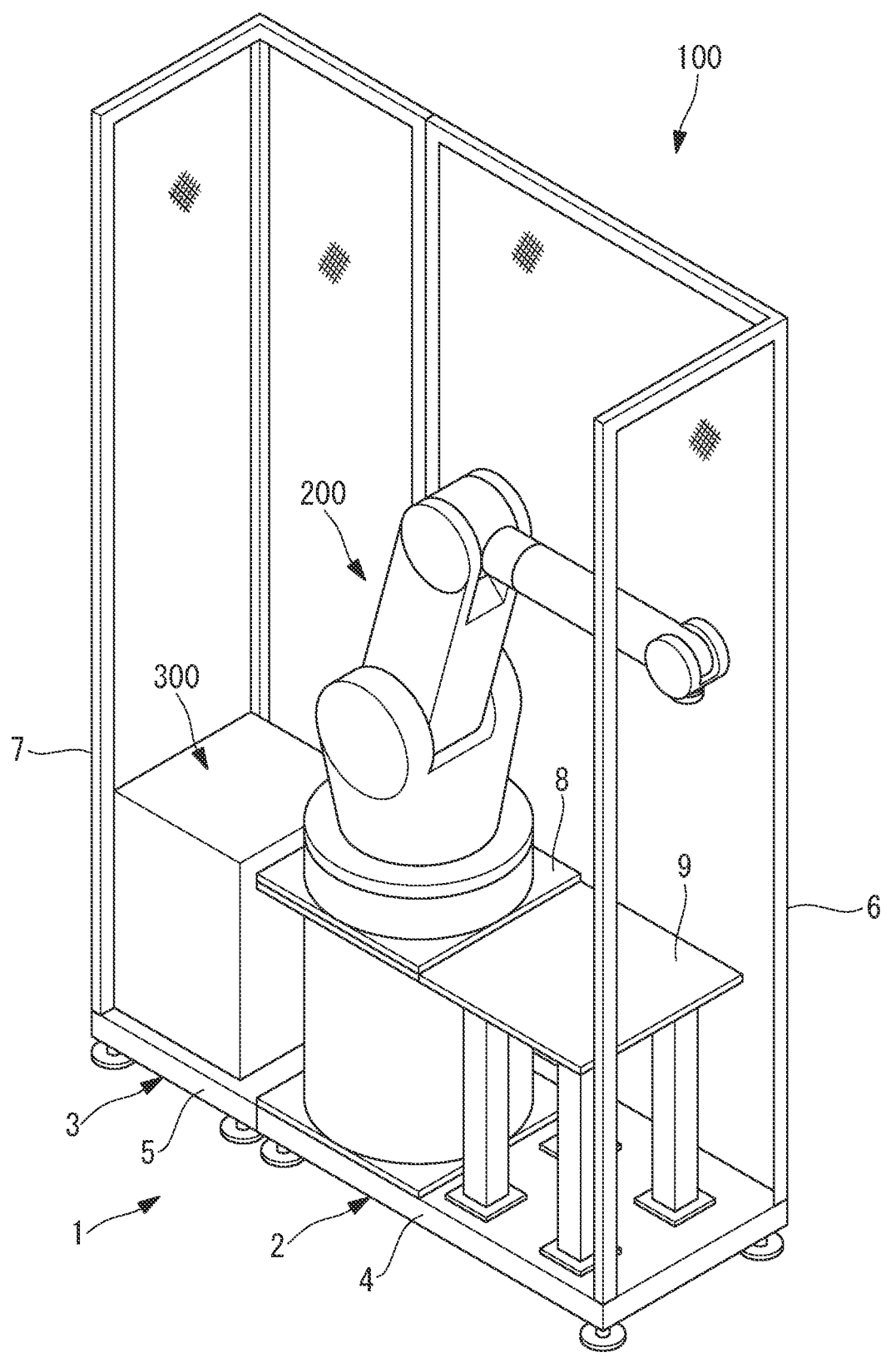
FIG. 1 is a perspective view showing an external robot stand and an external robot system according to one embodiment of the present disclosure.
Figure 3:
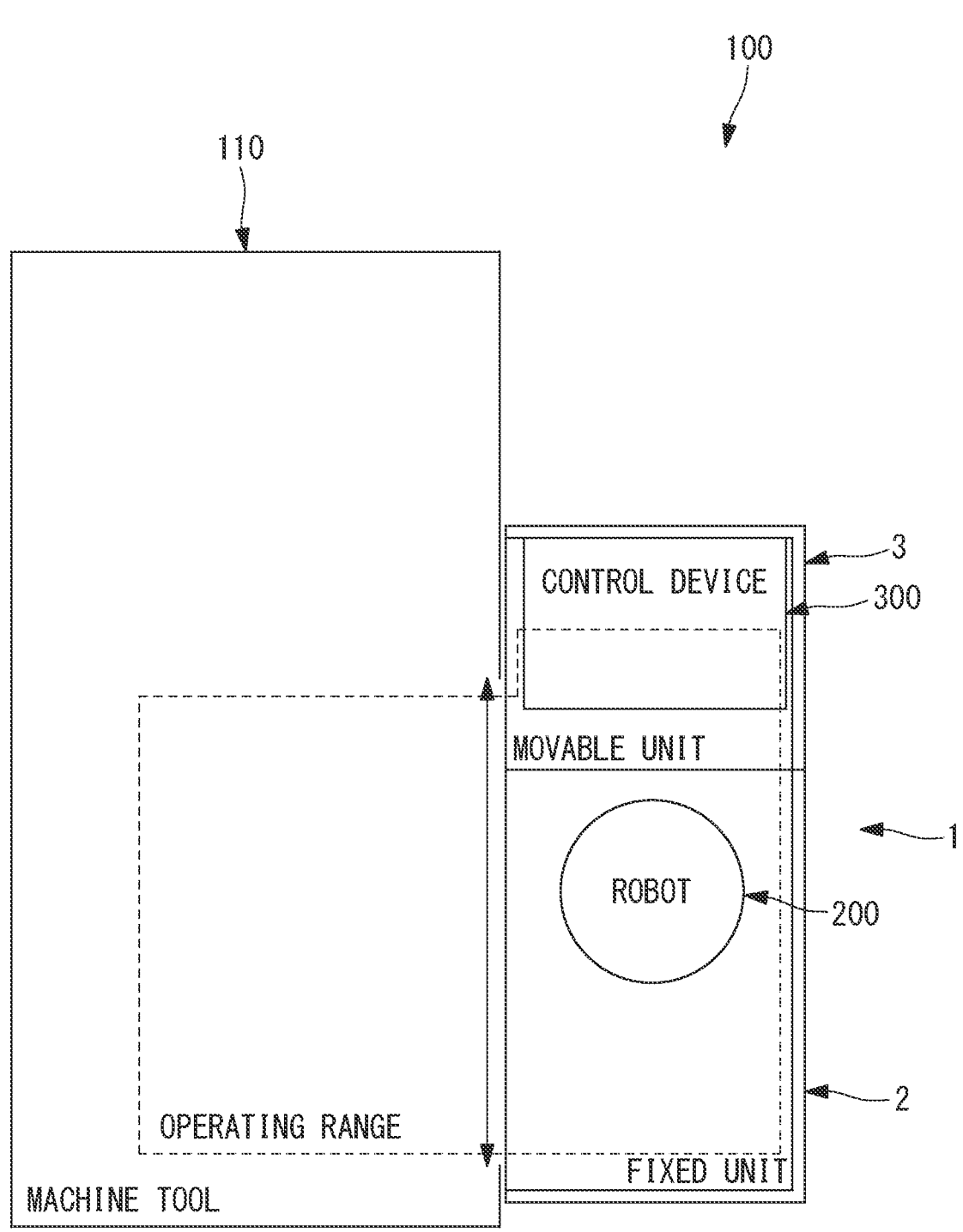
FIG. 3 is a plan view schematically showing the external robot system of FIG. 1 installed adjacent to a machine tool.

As shown in FIG. 3, the external robot system 100 of this embodiment is a system installed adjacent to a side door of a machine tool 110. As shown in FIG. 1, the external robot system 100 includes: the external robot stand 1 according to the embodiment of the present disclosure; a robot 200; and a control device 300 that controls the robot 200.

The external robot stand 1 of this embodiment includes a fixed unit 2 and a movable unit 3 that are combined in a separatable manner.

The fixed unit 2 and the movable unit 3 respectively include: stand bases 4 and 5 that are each installed on a floor surface by using four or more legs; and safety fences 6 and 7 that are fixed above the stand bases 4 and 5, respectively.

The fixed unit 2 includes: a robot stand (robot installation surface) 8 that is fixed to the stand base 4 and on which the robot 200 can be installed; and an equipment installation stand 9. The equipment installation stand 9 is a stand on which at least one of a tool, such as a hand for replacement, and a member, such as a workpiece, that need to be positioned with respect to the robot 200, the member being supplied to the machine tool 110, can be disposed in such a state as to be positioned with respect to the robot stand 8.

In the movable unit 3, the control device 300 is mounted on the stand base 5.

When the fixed unit 2 and the movable unit 3 are combined, and the robot 200 is fixed to the robot stand 8 in a positioned state, an operating range of the robot 200 is arranged to extend across both the fixed unit 2 and the movable unit 3, as shown in FIG. 3.

The robot 200 has a hand (not shown) at the distal end thereof, for example. The robot 200 grips, with the hand, a workpiece (not shown) placed on the equipment installation stand 9, which is disposed in the fixed unit 2, and transfers the workpiece to a chuck of the machine tool 110 via the opened side door. Furthermore, the robot 200 detaches the workpiece that has been machined at the machine tool 110 from the chuck and disposes the workpiece on the equipment installation stand 9. Thus, the robot 200, which is installed on the robot stand 8, has an operating range extending from the fixed unit 2 and the movable unit 3 to the inside of the machine tool 110.

As described above, the external robot stand 1 of this embodiment is installed at a position opposed to and adjacent to the side door of the machine tool 110. The external robot stand 1 is formed in a rectangular shape in plan view, for example. The safety fences 6 and 7 are disposed on three surfaces, except one surface that faces the machine tool 110 when the external robot system 100 is installed adjacent to the machine tool 110. The safety fences 6 and 7 surround the outer side of the operating range of the robot 200 together with the machine tool 110 when the external robot system 100 is disposed adjacent to the side surface of the machine tool 110.

Figure 2:
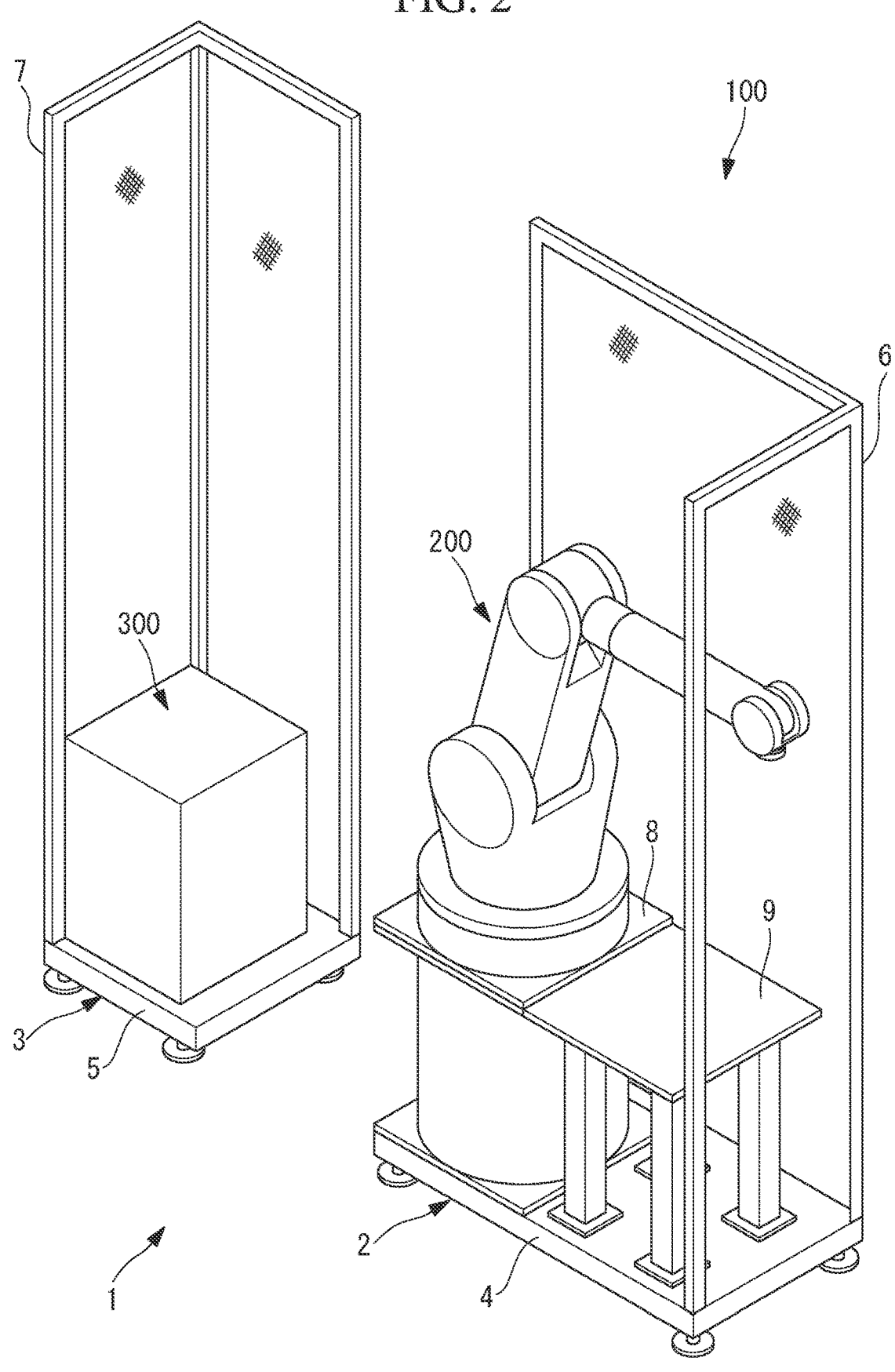
FIG. 2 is a perspective view showing a state in which a fixed unit and a movable unit are separated from each other, in the external robot stand and the external robot system shown in FIG. 1.

That is, the fixed unit 2 and the movable unit 3 are individually formed in rectangular shapes having short sides of the same length, in plan view, and are combined such that connecting surfaces including the short sides of the same length are connected. Therefore, in the fixed unit 2 and the movable unit 3, the safety fences 6 and 7 are respectively disposed on one surface that faces toward the machine tool 110 when the external robot system 100 is installed adjacent to the machine tool 110 and on two surfaces except the connecting surfaces, as shown in FIG. 2. The fixed unit 2 and the movable unit 3 are connected by fastening bolts (not shown), for example.

The operation of the thus-configured external robot stand 1 and external robot system 100 of this embodiment will be described below.

The external robot system 100 of this embodiment is assembled at a factory of a system integrator and is set up, together with the machine tool 110, whereby instructions etc. are given to the robot 200 and the machine tool 110. Then, after completion of the set-up operation at the system integrator, the external robot system 100 is relocated to a factory of an end user.

Specifically, at the factory of the system integrator, the fixed unit 2 is fixed to a floor surface so as to be adjacent to the machine tool 110, the robot 200 is installed on the robot stand 8 of the fixed unit 2 in a positioned state, and the movable unit 3 is connected to the fixed unit 2. In this state, since the outer side of the operating range of the robot 200 is surrounded by the safety fences 6 and 7, necessary instructions are given to the robot 200 to grip a workpiece, to transfer the workpiece, and to attach/detach the workpiece to/from the machine tool 110, and instructions are given to the machine tool 110.

After completion of the setting-up at the factory of the system integrator, the fixed unit 2 is removed from the floor surface. Then, the external robot system 100, which is configured of the connected fixed unit 2 and movable unit 3, the robot 200 installed on the robot stand 8 of the fixed unit 2, and the control device 300 installed on the movable unit 3, is transferred, as one unit, to the factory of the end user.

The external robot system 100 that has been transferred to the factory of the end user is disposed at a position adjacent to the side door of the machine tool 110, and the fixed unit 2 is fixed to a floor surface in such a state as to be positioned with respect to the machine tool 110. At this time, since the positional relation between the machine tool 110 and the external robot system 100 set once at the system integrator is strictly shifted at the end user, it is necessary to perform calibration. Then, a detected shift is corrected by performing calibration, whereby it is possible to use the robot 200 and the machine tool 110 without re-instructing a program instructed at the system integrator.

When the external robot system 100 is installed at a position adjacent to the machine tool 110, the safety fences 6 and 7, which are respectively provided on the fixed unit 2 and the movable unit 3, cover three surfaces of the outer side of the operating range of the robot 200, which is installed on the robot stand 8, and the machine tool 110 covers the remaining one surface thereof. Accordingly, an operator is prohibited from entering the operating range of the robot 200 by the safety fences 6 and 7. Then, the robot 200 can perform workpiece delivery work etc. between a region inside the external robot stand 1, which is surrounded by the safety fences 6 and 7, and a region inside the machine tool 110 that is accessed via the opened side door.

Figure 4:
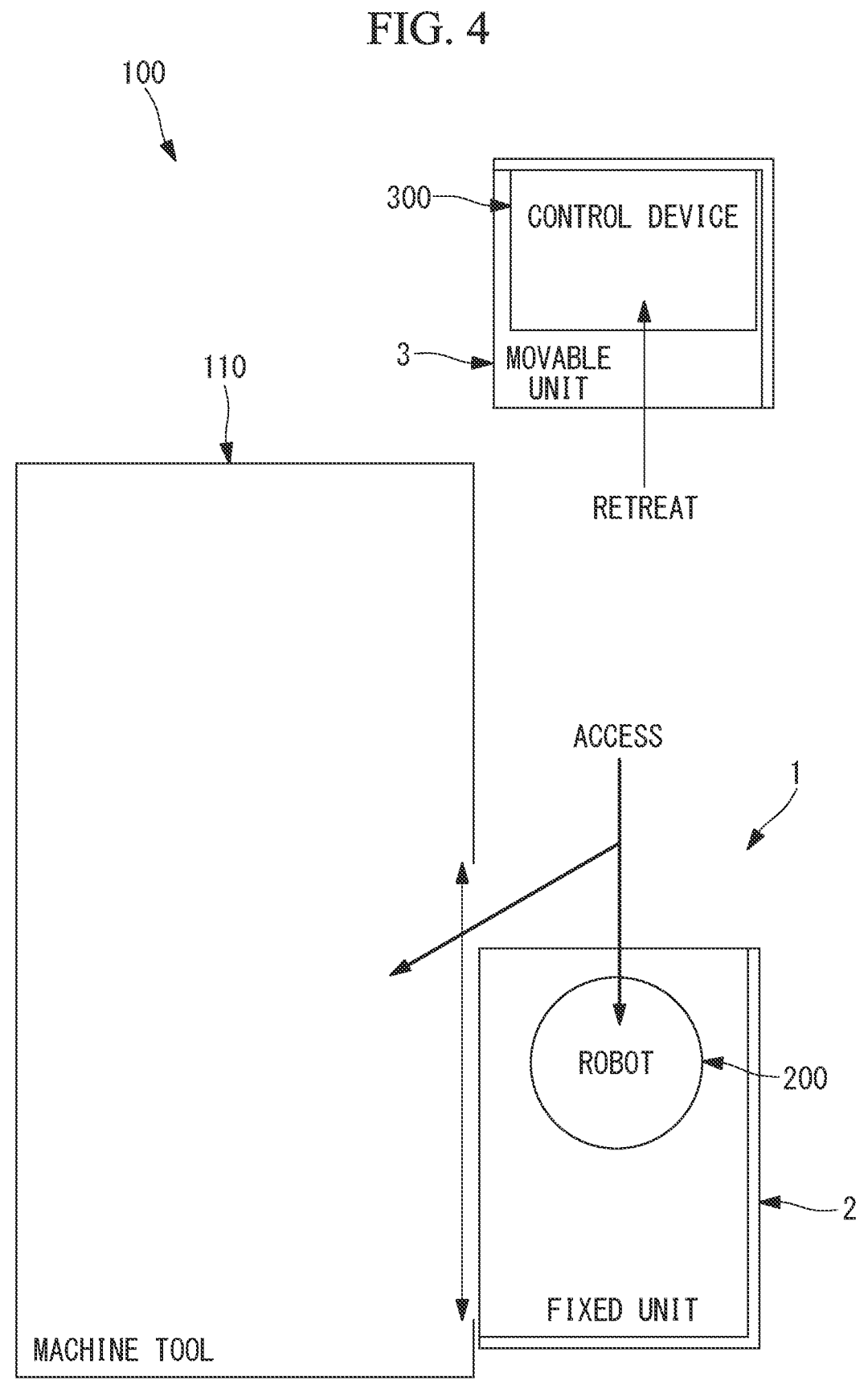

Furthermore, at the end user, when a need for maintenance of the robot 200, the control device 300, or the machine tool 110 arises, the movable unit 3 and the fixed unit 2 are disconnected, as shown in FIGS. 2 and 4. Then, while the fixed unit 2 is fixed to the floor surface, only the movable unit 3 is retracted. At this time, the robot 200 and the control device 300 can be separated just by disconnecting a cable.

Since the safety fence 7, which is attached to the movable unit 3, is removed by moving the movable unit 3, the operator can easily access the inside of the fixed unit 2 and the machine tool 110, which are opened now. Furthermore, the operator can also easily access the control device 300, which is mounted on the movable unit 3, at the retreat position. Furthermore, the movable unit 3 is removed, thereby making it possible to secure, as a space for maintenance, the space where the movable unit 3 was located and to improve the ease of maintenance work.

In this case, according to the external robot stand 1 and the external robot system 100 of this embodiment, since the robot 200 and a tool and a member that need to be positioned with respect to the robot 200 are all disposed on the fixed unit 2, it is unnecessary to change the positions thereof for maintenance. Therefore, it is unnecessary to re-instruct the robot 200 after the maintenance, whereby there is an advantage in that extra man-hours does not need to be taken.

Figure 5:
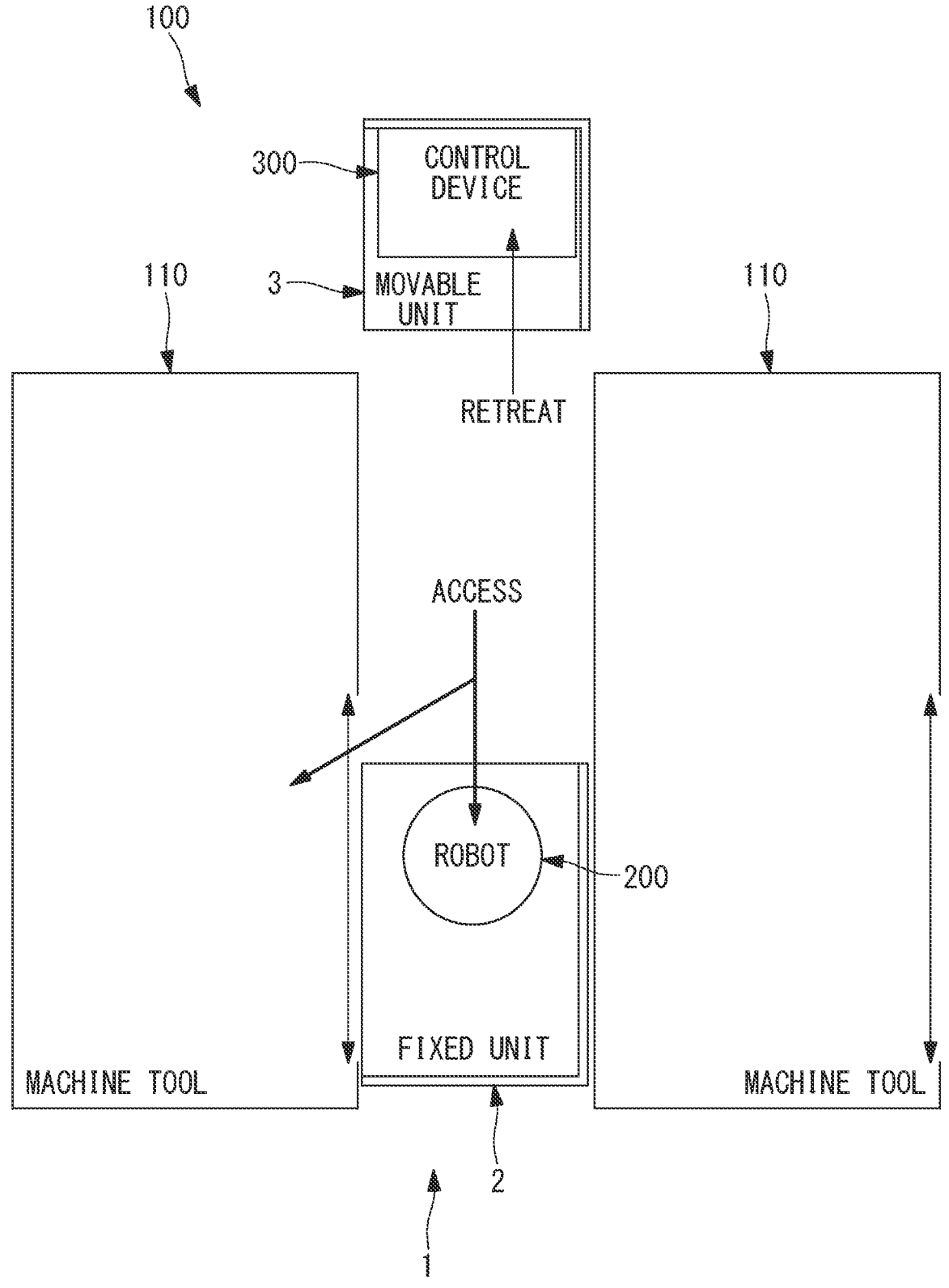
FIG. 5 is a plan view schematically showing a modification of the installation of the external robot system shown in FIG. 1.

According to the external robot stand 1 of this embodiment, since the fixed unit 2 and the movable unit 3 are connected by connecting surfaces including a short side in plan view, the movable unit 3 disconnected from the fixed unit 2 is just moved in a direction perpendicular to the connecting surfaces, whereby a maintenance space can be formed. Specifically, there is an advantage in that, for the space to which the movable unit 3 is moved, a large space is not required. This is especially effective in a case in which the space to which the movable unit 3 is moved is limited, such as a case in which the external robot stand 1 is installed in a narrow space between two machine tools 110, as shown in FIG. 5, for example.

In this embodiment, the movable unit 3 is installed on the floor surface by using four or more legs. Therefore, the movable unit 3 can stably stand by itself even in a state of being disconnected from the fixed unit 2, whereby it is unnecessary to make the movable unit 3 lean or lie on the floor after disconnection, and handling thereof is easy.

Since the movable unit 3 includes the stand base 5, which stands by itself, the movable unit 3 can be moved not only by a crane but also by a hand fork or the like, after being disconnected from the fixed unit 2. Therefore, there is an advantage in that maintenance work can be easily performed without choosing a work site, such as a factory where a crane is not included.

Figure 6:
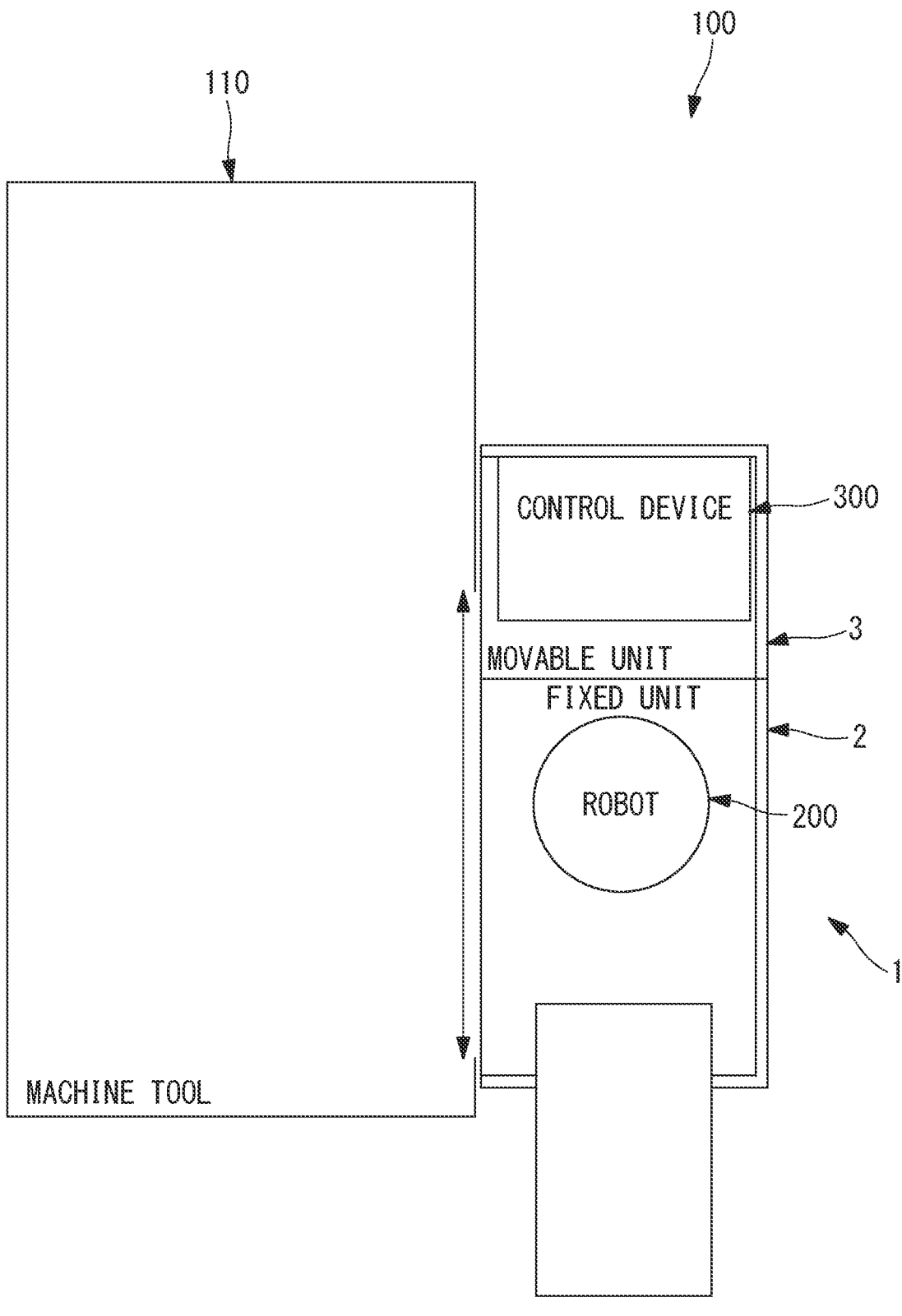
FIG. 6 is a plan view schematically showing another modification of the installation of the external robot system shown in FIG. 1.

Note that, in the external robot system 100 of this embodiment, the equipment installation stand 9 is disposed on the fixed unit 2, and a tool, such as a hand, for replacement or a member, such as a workpiece, that needs to be positioned with respect to the robot 200 is disposed on the equipment installation stand 9. Instead of this, as shown in FIG. 6, it is also possible that a tool or a member that needs to be positioned with respect to the robot 200 is transferred, in a positioned state, from the outside of the fixed unit 2 by a transport means, such as a conveyor, fixed to the fixed unit 2.

Although an example case in which the control device 300 is mounted on the movable unit 3 has been illustrated, the place where the control device 300 is mounted is not limited thereto, and the control device 300 may also be mounted on the fixed unit 2. Furthermore, instead of the control device 300, one or more devices or members that do not need to be positioned with respect to the robot 200 may also be mounted on the fixed unit 2. For example, in the case where a cylinder or the like that presses a tool or a workpiece is installed on the fixed unit 2, control equipment (an air unit, a hydraulic system, or the like) that controls the cylinder or the like may also be mounted on the movable unit 3.

The robot 200 may also be fixed to the robot stand 8 in a positioned state and in a detachable manner by means of a positioning pin(s). Accordingly, even if the robot 200 is removed from the robot stand 8, the robot 200 can be returned to the original position. Since the robot stand 8 on the fixed unit 2 is maintained in a state of being fixed with respect to the machine tool 110, it is not necessary to re-instruct the robot 200 after the robot 200 is returned.

Since the movable unit 3 does not need to be positioned with respect to the robot 200, the movable unit 3 may include casters for facilitating movement thereof at the time of retraction, instead of legs for installing the movable unit 3 on the floor surface.

In this embodiment, it is also possible to provide a sensor (for example, a proximity sensor or the like) for detecting an attachment/detachment state of the fixed unit 2 and the movable unit 3. Accordingly, it is possible to accurately detect the attachment/detachment state of the fixed unit 2 and the movable unit 3 and to suppress an operation(s) of the machine tool 110 and/or the robot 200 in a state in which the fixed unit 2 and the movable unit 3 are separated.

Figure 7:
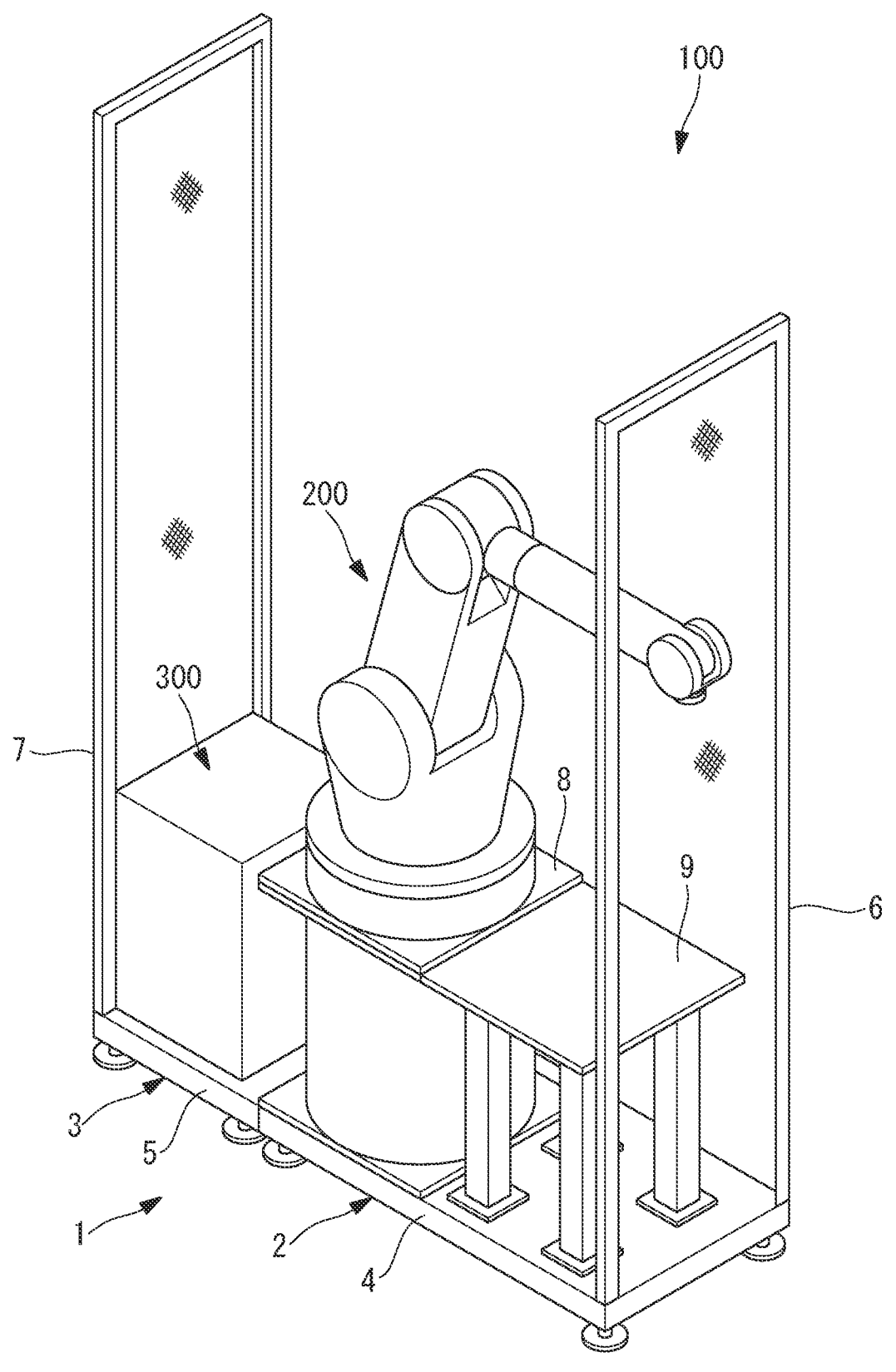
FIG. 7 is a perspective view showing a modification of the external robot stand and the external robot system shown in FIG. 1.

In this embodiment, although an example of the external robot stand 1 in which the safety fences 6 and 7 are disposed on three surfaces except one surface facing the machine tool 110 has been illustrated, instead of this, as shown in FIG. 7, it is also possible to adopt a configuration in which the safety fences 6 and 7 are disposed on only two surfaces opposed to each other.

Figure 8:
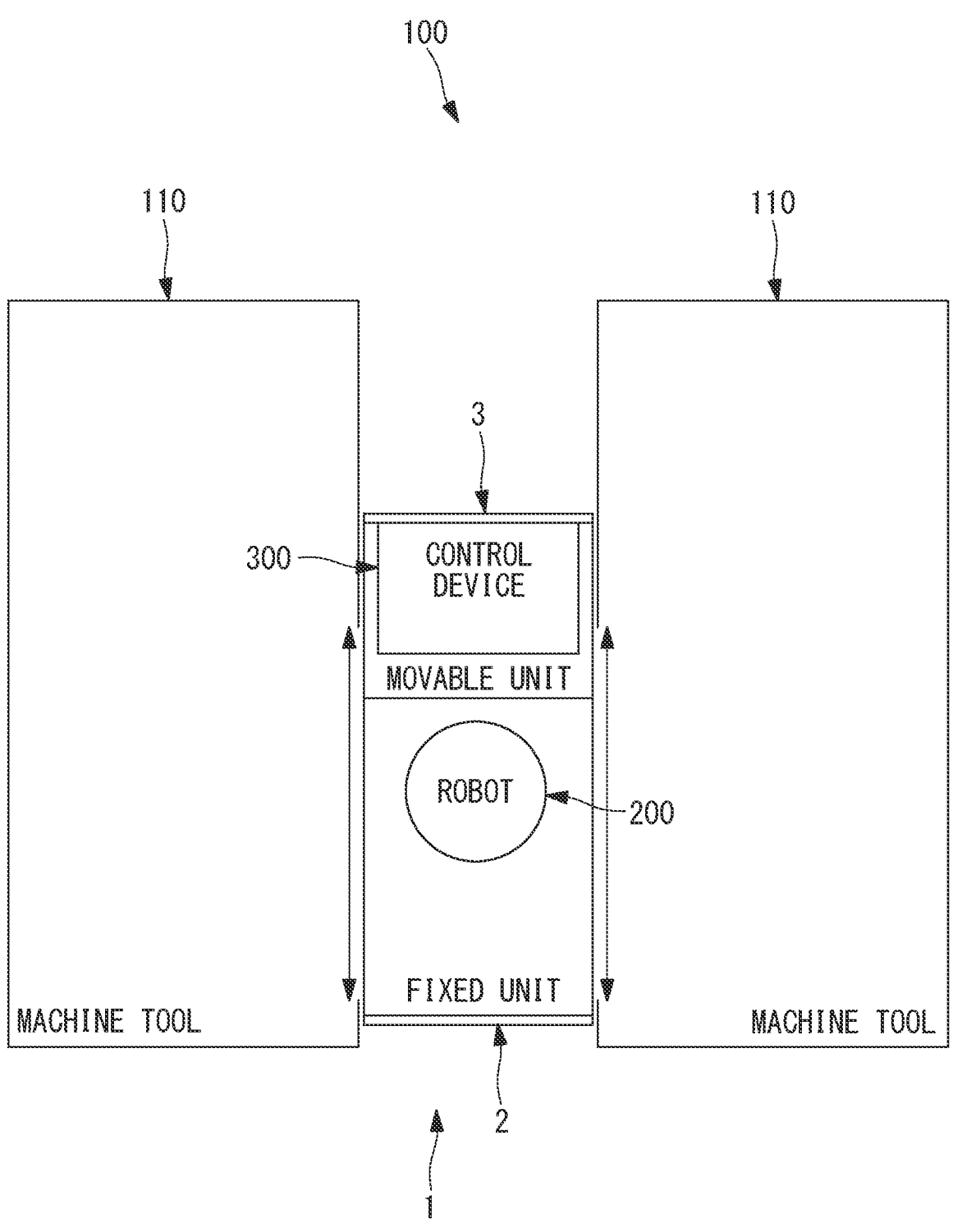
FIG. 8 is a plan view schematically showing an external robot system of FIG. 7 installed adjacent to machine tools.

Accordingly, for example, as shown in FIG. 8, in a case in which the external robot stand 1 is installed in a narrow space between the machine tool 110 that has a side door provided on the right side and the machine tool 110 that has a side door provided on the left side, this configuration is especially effective in that, for the space to which the movable unit 3 is moved, a large space is not required.

The invention claimed is:

1. An external robot stand that is installed outside a machine tool, the external robot stand comprising a fixed unit fixed to the machine tool in a positioned state and a movable unit attached to the fixed unit in a detachable manner, wherein:

the fixed unit is provided with a robot installation surface configured to install a robot that performs work with respect to the machine tool;

an operating range of the robot is arranged to extend across both the fixed unit and the movable unit;

the fixed unit and the movable unit are respectively provided with safety fences that surround an outer side of the operating range of the robot together with the machine tool in a state in which the movable unit is attached to the fixed unit;

each of the fixed unit and the movable unit has a rectangular shape in plan view;

the safety fences comprises a first safety fence provided at the fixed unit and a second safety fence provided at the movable unit;

the first safety fence is disposed on two sides of the fixed unit having the rectangular shape, except for a side facing the machine tool and a side connecting to the movable unit; and the second safety fence is arranged on two sides of the movable unit having the rectangular shape, except for a side facing the machine tool and a side connecting to the fixed unit.

2. The external robot stand according to claim 1, wherein the fixed unit is configured to have, mounted thereon, at least one of a device that needs to be positioned with respect to the robot and a member that needs to be positioned with respect to the robot, in such a state as to be positioned with respect to the robot installation surface.

3. The external robot stand according to claim 2, wherein the member that needs to be positioned with respect to the robot is a workpiece.

4. The external robot stand according to claim 2, wherein the device that needs to be positioned with respect to the robot is a tool that is mounted on the robot in a detachable manner.

5. The external robot stand according to claim 2, wherein the movable unit is configured to have, mounted thereon, at least one of a device that does not need to be positioned with respect to the robot and a member that does not need to be positioned with respect to the robot.

6. The external robot stand according to claim 5, wherein the device that does not need to be positioned with respect to the robot is a control device that controls the robot.

7. The external robot stand according to claim 1, further comprising a sensor that detects an attachment/detachment state of the fixed unit and the movable unit.

8. An external robot system comprising:

the external robot stand according to claim 1; and a robot installed on the robot installation surface of the fixed unit.

9. The external robot system according to claim 8, further comprising a controller that controls the robot, the controller mounted on the movable unit.

* * * * *